Figure 2:
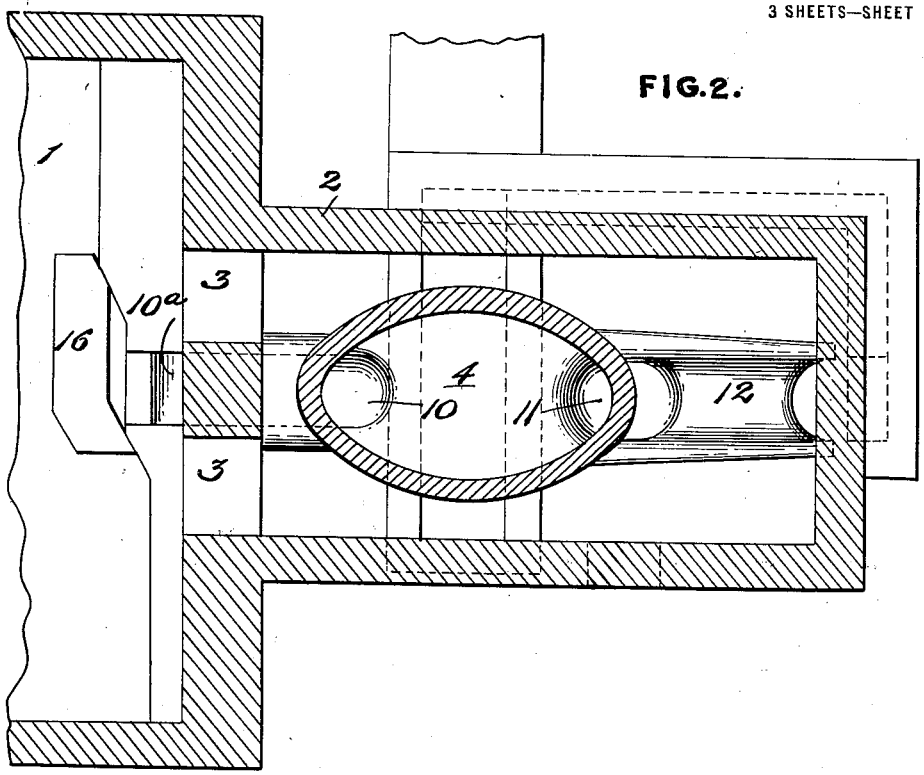

H. K. HITCHCOCK.
FEEDING GLASS.
APPLICATION FILED SEPT. 26, 1913.

1,275,424.

Patented Aug. 13, 1918.
3 SHEETS—SHEET 1.

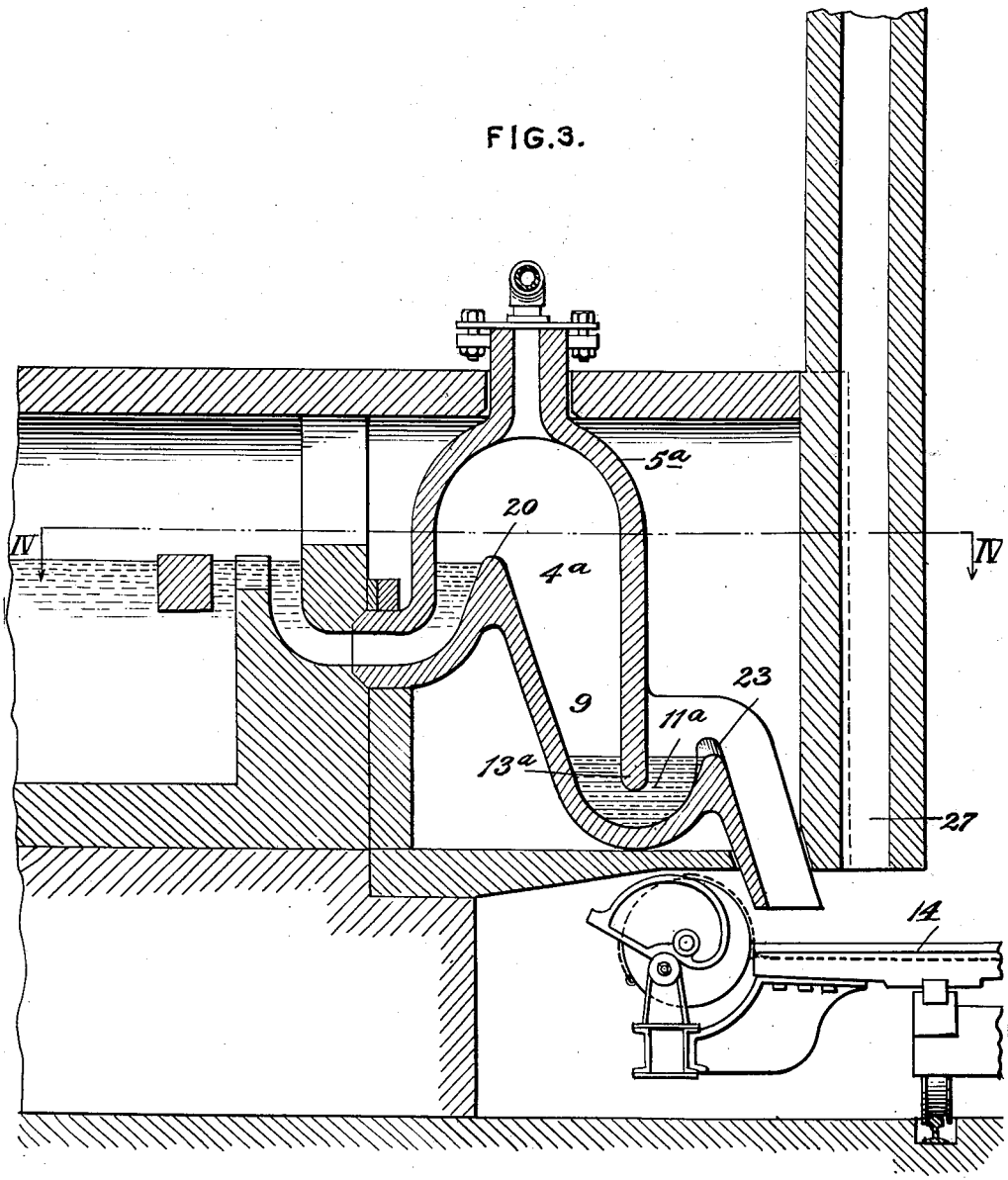

H. K. HITCHCOCK.
FEEDING GLASS.
APPLICATION FILED SEPT. 26, 1913.

1,275,424.

Patented Aug. 13, 1918.

3 SHEETS—SHEET 3.

WITNESSES:

INVENTOR

UNITED STATES PATENT OFFICE.

HALBERT K. HITCHCOCK, OF TARENTUM, PENNSYLVANIA, ASSIGNOR OF ONE-HALF TO HITCHCOCK EXPERIMENT COMPANY, A CORPORATION OF NEW JERSEY.

FEEDING GLASS.

1,275,424.           Specification of Letters Patent.     Patented Aug. 13, 1918.

Application filed September 26, 1913. Serial No. 792,010.

*To all whom it may concern:*

Be it known that I, HALBERT K. HITCHCOCK, residing at Tarentum, in the county of Allegheny and State of Pennsylvania, a citizen of the United States, have invented or discovered certain new and useful Improvements in Feeding Glass, of which improvements the following is a specification.

It is the object of the invention to discharge from a tank-furnace or other receptacle containing molten glass, successive and preferably predetermined quantities of the glass in a very uniform state, so that it may be used for the manufacture of plate glass or other glassware of high grade. Thus while the invention is not limited to, it will be herein described in connection with, the manufacture of plate glass.

In order to have a satisfactory sheet of plate glass it is necessary that the glass itself shall be uniform in respect of its index of refraction, since when the sheet is ground and polished, any material variation in the index of refraction of the glass making up the sheet will cause a distortion of the objects viewed through it.

In order to obtain the necessary uniformity in the index of refraction, it is essential that the glass shall be subjected to a very high heat, so that it shall become very liquid, since when it is in this condition the tendency is the greatest for it to become uniform in chemical and physical composition.

Heretofore glass to be rolled into plate glass which is subsequently to be polished, has been made in pots, into which a given batch is introduced and brought to a very high heat, thus causing the contents of the pot to boil and to agitate the mixture so as to obtain a homogeneous product. Other means have also been employed for effectively stirring the glass in the pot. When the glass is in proper condition it is poured directly from the pot upon the casting-table.

This operation not only involves much labor and expense, but there has always been difficulty in obtaining pots which shall be, first, sufficiently refractory to withstand the high temperature of the furnace in which they are heated; second, of a strength sufficient to withstand the pressure of the liquid glass contained in them; and third, of such composition as to resist the fluxing action of the substance used in making the glass, so that small particles of the pot shall not come off and enter the glass, thus in some cases injuring the quality of the glass itself.

In the well known Siemens tank-furnace, it is possible to obtain a very high heat, thus bringing the glass to a highly fluid condition, and at the same time by the use of modern methods the glass in the refining end of the tank is practically homogeneous. Since the outer walls of the tank-furnace are exposed to the atmosphere, it is possible to obtain a much higher temperature in a tank than it is in a furnace wherein glass is melted in pots, and the pots themselves are subjected to the temperature of the furnace. The glass in the refining end of the tank furnace is also generally free from seed and bubbles.

It has been attempted to ladle the glass from the tank and pour it upon a casting table and there roll it into sheet form. While laborious, this operation has been practically used only where the glass is not to be subsequently ground and polished. Where the glass sheet is to be ground and polished, this operation of ladling has not been successful, for the reason among others that the ladle chills a part of the glass, and this chilled glass having an index of refraction different from that of the hotter portion of glass, when the two are rolled together into a sheet and the sheet is polished, it will have a wavelike appearance which distorts the image seen through it, and it is thus of inferior quality. Ladled glass is also likely to contain bubbles, and to be otherwise of inferior quality.

In the practice of the present invention, I am enabled to withdraw successive, and preferably predetermined, quantities of glass directly from the mass in the refining end of the well known tank-furnace, and to discharge the successive quantities, in the same order, directly upon the surface of a plate-glass casting-table or other shaping mechanism, without the employment of manual labor. Thus I may withdraw from the furnace each time a sufficient quantity of glass to form one plate of the desired size, and deposit the glass so withdrawn evenly along the edge of the casting table. I am thus enabled to manufacture from tank glass successive glass plates which shall each be homogeneous and of a uniformly good quality.

Figure 1:
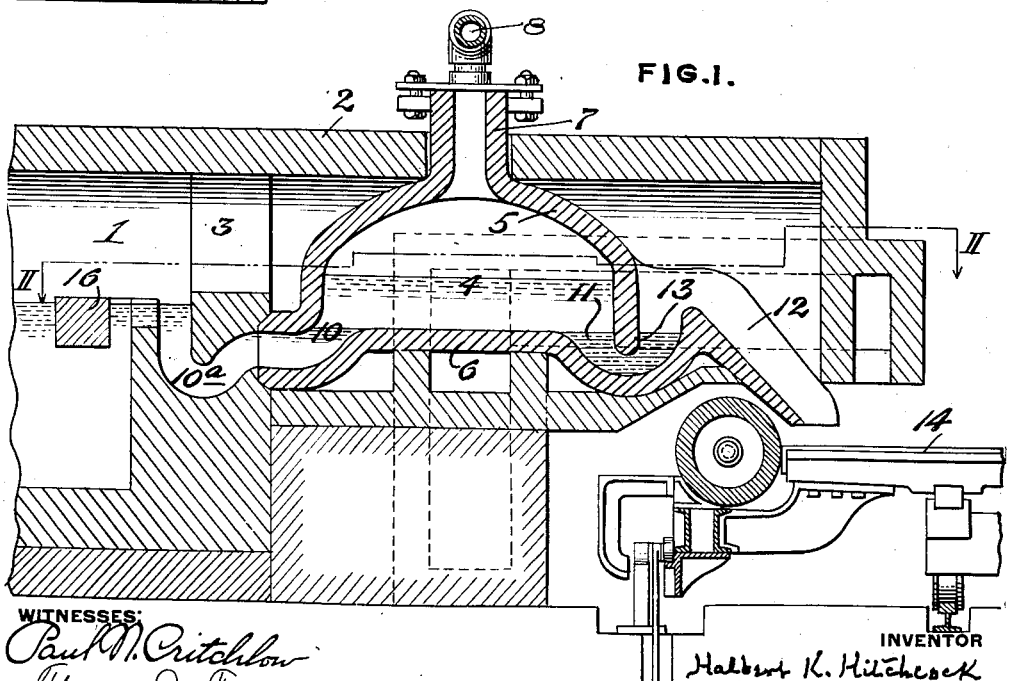
Figure 4:
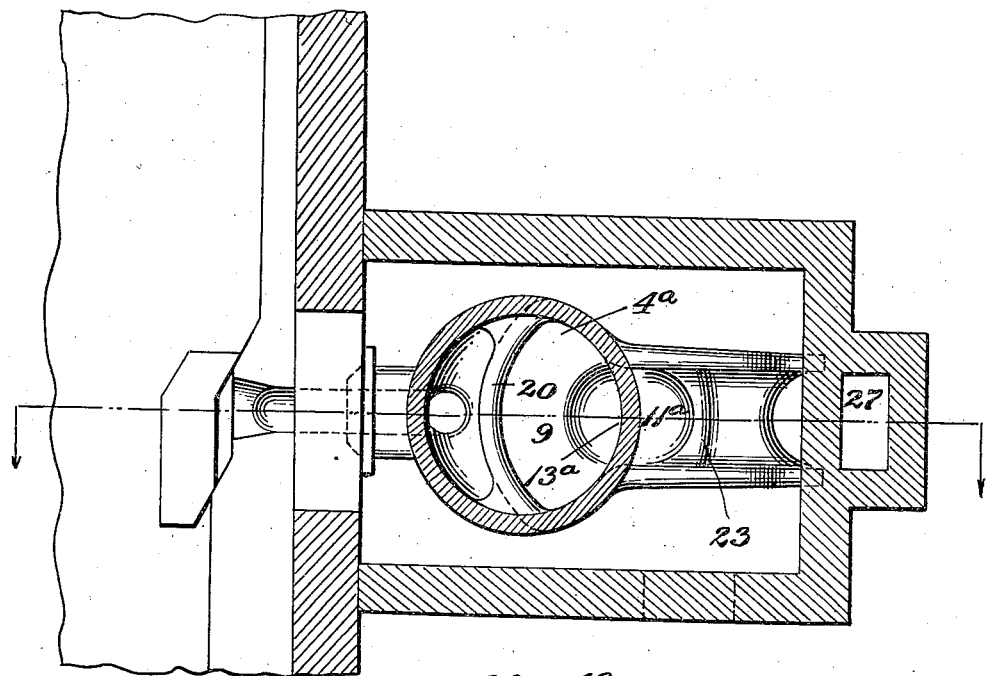
Figure 5:
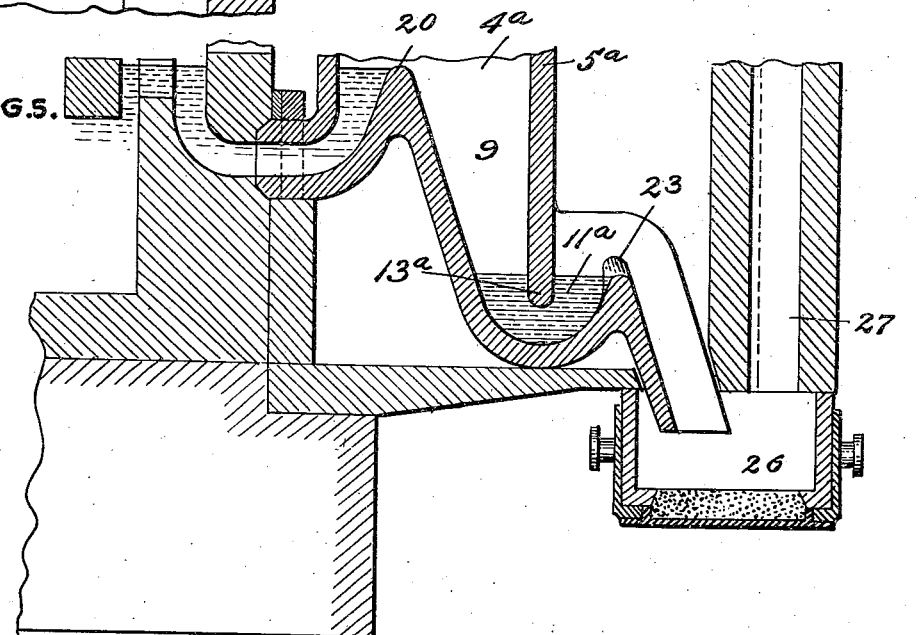

In the accompanying drawings, I have illustrated two forms of apparatus suitable for the practice of the invention. Figure 1 is a vertical longitudinal section showing the delivery end of a tank-furnace, and the apparatus which I prefer to employ in connection therewith. Fig. 2 is a horizontal section on the line II—II of Fig. 1. Fig. 3 is a view similar to Fig. 1, showing a modified form of apparatus. Fig. 4 is a horizontal section on the line IV—IV of Fig. 3. Fig. 5 is a view of the lower portion of Fig. 3, showing the casting-table removed, and a box of refractory material introduced into its place beneath the discharge-spout, for a purpose to be hereafter explained.

The apparatus herein shown and to be described is an improvement upon that described in Letters Patent, No. 805,067, granted to me on November 21st, 1905, but in order to handle the large volume of glass required to make a sheet of plate glass of commercial size, the small displacement chamber 4 shown in the patent above referred to has been greatly enlarged, and other modifications and substantial changes have been made.

Referring first to Figs. 1 and 2 of the drawings, the tank-furnace 1, which may be of any well known or suitable construction, is provided with an extension 2 at its delivery end, into which the products of combustion will pass from the body of the furnace through the openings 3, 3, arranged in the inner wall of the extension above the glass level. In the extension is arranged a displacement chamber 4, consisting of a dome-shaped shell 5, resting with its lower edge hermetically sealed upon the floor 6. The shell 5 of the chamber is provided with a hollow neck 7 projecting up through the roof of the extension, where it is connected by the pipe 8 to suitable pressure regulator, not shown. The displacement chamber is preferably elliptical in cross-section, for a purpose to be presently mentioned, and in the floor 6 at its opposite ends are formed gutters 10 and 11. The inner gutter 10 communicates with a passageway 10$^a$ leading from the tank through the inner wall of the extension below the level of the glass, and the edge of the shell 5 above the gutter is in sealing contact with the said inner wall. The outer gutter 11 passes under the edge of the shell 5 and upwardly, where it joins or is formed integrally with the spout 12. The edge 13 of the shell 5 at the gutter 11 is projected downwardly into the gutter for a purpose which will presently appear.

A plate glass casting-table, (fragmentarily shown at 14), may be arranged to be moved on tracks with its inner edge passing beneath the spout 12, the lip of which is arranged as close to the surface of the table as possible, in order to deposit the molten glass evenly along the edge of the table as the table passes beneath it.

I have shown a float-valve 16 of refractory material arranged to close the opening from the body of the tank into the passageway 10$^a$ but it will be understood that this valve will stand open during the operations hereinafter described in order to allow the glass to flow from the tank into the displacement chamber.

In the operation of the apparatus thus far described it will be assumed that, by means to be presently explained, the glass in the displacement chamber 4 has practically all been forced out, and the glass in the outlet 11 as well as in the inlet 10 will be at approximately the level of the floor 6. By means of any suitable pressure regulator, air is then exhausted from the displacement chamber through the pipe 8, in order to draw into the chamber the desired quantity of glass. The vacuum so formed causes the glass in the outlet 11 outside the depending edge 13 to fall slightly, but the vacuum is so regulated that the level of this glass will not fall below the edge 13, and the glass is thus drawn from the tank through the inlet 10 until it reaches the desired level in the displacement chamber, the vacuum being so regulated as to draw in a predetermined quantity, which will be sufficient, when the glass is discharged from the furnace, to form a sheet of plate glass of the desired size. Then when it is desired to discharge the glass, air under pressure is admitted through the pipe 8, thus forcing the glass out of the spout 12 and upon the surface of the table, which may be moved along beneath it. A small quantity of the glass in the displacement chamber 4 will of course be forced back into the inlet 10, but since the passageway for the glass from the body of the tank into the chamber presents a considerably greater resistance to the flow of the glass than does the outlet 11, the greater bulk of the glass in the displacement chamber will pass out of the spout. The vacuum operating to draw the glass into the displacement chamber is accurately regulated, in accordance with rules well known in the art, to satisfy all the necessary conditions, and to store in the displacement chamber at each operation exactly the required quantity of glass. After practically all the glass has been forced out from the displacement chamber, the above described operation is repeated.

It will be noted that at each operation practically all the glass discharged will be glass which is fresh from the tank and from the inlet passage 10, but at the commencement of each discharge the glass first discharged will be the small quantity which has been left in the outlet opening 11 from the previous operation. This small quantity is discharged right at the front of the edge of the table, and will ultimately lie along the front tranverse edge of the sheet when rolled. If this small quantity causes any defect in the sheet, this edge may be cut off with very little loss. Or, if it should be desired, a small crucible may be mounted at the front of the table at its inner edge, to catch this initial small quantity of glass, which can then be recharged into the body of the furnace.

The displacement chamber 4 is preferably made elliptical in cross-section, in order that the particles of glass may have as nearly as possible a straight line of flow from the tank to the table, without the formation of eddies in the displacement chamber, and thus the particles composing each mass of glass discharged will be maintained so far as possible in the same relative order of flow.

Figs. 3, 4 and 5 illustrate a somewhat modified form of displacement chamber 4ᵃ which may be operated in substantially the same way. This displacement chamber is provided with a dam 20 extending above the level of the glass in the tank and a predetermined quantity of glass is drawn over the dam into the body or well 9 of the chamber from which it is to be discharged, by the means already described. In order to initiate the operation sufficient glass is ladled into the outlet 11ᵃ to immerse the downwardly projecting edge 13ᵃ of the shell 5ᵃ of the displacement chamber. A vacuum is then created in the displacement chamber as already described, in order to cause the glass from the tank to overflow the dam 20. As the quantity of glass increases in the body 9 of the displacement chamber, the vacuum should also be increased, so as to prevent the glass from running over the edge 23 of the outlet. After a sufficient quantity of glass has been drawn into the body of the displacement chamber, which quantity, as already stated, can be accurately predetermined by the amount of vacuum in the displacement chamber, the vacuum is relieved and the glass is discharged from the displacement chamber through the outlet and upon the table by the force of gravity only, or its movement can be accelerated by the use of compressed air, leaving the necessary quantity of glass in the outlet 11ᵃ to preserve the seal.

After the glass has been discharged and the table drawn from beneath the spout the closed box 26 may be placed over the spout and the flue 27, thus affording an upward path through the flue for the products of combustion from the furnace.

It will of course be apparent that the body or well 9 of the displacement chamber 4ᵃ may be made of sufficient size to hold two or more masses of the quantity desired to be discharged at each operation. In such case it will still be characteristic that not only will the particles composing each mass be maintained in substantially the same relative order of flow, but the tandem relation of the individual masses, each considered as a whole, will also be preserved.

No claim is made herein to the particular apparatus described, since the method constituting the present invention may be practised by means of many forms of apparatus. Those herein described will be made the subjects of other applications for patents.

I claim as my invention:

1. The method of feeding molten glass to shaping mechanism, which consists in drawing a predetermined quantity of the glass from a receptacle containing molten glass into a displacement chamber through an opening below its top, and then discharging the glass so withdrawn to the shaping mechanism, while maintaining the particles composing the mass in substantially the same relative order of flow.

2. The method of feeding molten glass to shaping mechanism, which consists in drawing a predetermined quantity of the glass from a receptacle containing molten glass into a stationary displacement chamber then discharging the glass so withdrawn to the shaping mechanism and substantially emptying the displacement chamber, and then drawing off and discharging a second quantity of glass.

3. The method of feeding molten glass to shaping mechanism, which consists in causing a quantity of the glass to flow from a receptacle containing molten glass into a stationary inclosed displacement chamber, then uninterruptedly discharging the glass from the displacement chamber directly to the shaping mechanism and substantially emptying the displacement chamber, and then repeating the operation.

4. The method of feeding molten glass to shaping mechanism, which consists in causing a quantity of the glass to flow from a receptacle containing molten glass, through a passage of relatively high resistance, into a displacement chamber, and then discharging the glass from the displacement chamber, through a passage of relatively low resistance, to the shaping mechanism, while maintaining the particles composing the mass in substantially the same relative order of flow.

5. The method of feeding molten glass to shaping mechanism, which consists in drawing by suction a predetermined quantity of the glass from a receptacle containing molten glass into a stationary inclosed displacement chamber, applying fluid pressure to the glass in the displacement chamber and thereby discharging it to the shaping mechanism and substantially emptying the displacement chamber, and then repeating the operation.

In testimony whereof I have hereunto set my hand.

HALBERT K. HITCHCOCK.

Witnesses:
   HORACE BARNES,
   E. PETERSON.